(12) United States Patent
Hortnagl (10) Patent No.: US 9,220,322 B2
(45) Date of Patent: Dec. 29, 2015

(54) TENSIONING APPARATUS (71) Applicant: ABA Hortnagl GmbH, Fulpmes (AT)

(72) Inventor: Andreas Hortnagl, Fulpmes (AT)

(73) Assignee: ABA Hörtnagl GmbH, Fulpmes (AT)

( * ) Notice: Subject to any disclaimer, the term of this patent is extended or adjusted under 35 U.S.C. 154(b) by 127 days.

(21) Appl. No.: 13/928,883

(22) Filed: Jun. 27, 2013

(65) Prior Publication Data
US 2014/0000073 A1 Jan. 2, 2014

(30) Foreign Application Priority Data
Jun. 28, 2012 (AT) .................................. A716/2012

(51) Int. Cl.
A44B 11/06 (2006.01)
B60P 7/08 (2006.01)

(52) U.S. Cl.
CPC ............... *A44B 11/065* (2013.01); *B60P 7/083* (2013.01); *Y10T 24/2113* (2015.01)

(58) Field of Classification Search
None
See application file for complete search history.

(56) References Cited

U.S. PATENT DOCUMENTS

| | | | |
|---|---|---|---|
| 2,754,560 A | 7/1956 | Warner et al. | |
| 2,852,827 A * | 9/1958 | Garland | 24/68 R |
| 3,099,055 A * | 7/1963 | Huber | 410/103 |
| 3,293,713 A | 12/1966 | Gaylord | |
| 3,328,856 A | 7/1967 | Jonas | |
| 3,574,342 A * | 4/1971 | Berns | 254/243 |
| 3,641,630 A | 2/1972 | Farley | |
| 3,686,715 A | 8/1972 | Brodnicki | |
| 3,852,855 A | 12/1974 | Bengtsson | |
| 4,118,833 A * | 10/1978 | Knox et al. | 24/68 CD |
| 4,608,735 A | 9/1986 | Kasai | |
| 4,726,625 A | 2/1988 | Bougher | |
| 4,809,953 A | 3/1989 | Kurita et al. | |
| 4,843,688 A | 7/1989 | Ikeda | |
| 5,058,244 A | 10/1991 | Fernandez | |
| 5,331,726 A | 7/1994 | Suh | |
| 6,665,913 B2 | 12/2003 | Kosh et al. | |
| 7,712,191 B2 * | 5/2010 | Huang | 24/68 CD |

(Continued)

FOREIGN PATENT DOCUMENTS

| | | |
|---|---|---|
| AT | 4661472 | 3/1974 |
| AT | 506290 | 8/2009 |

(Continued)

*Primary Examiner* — Jack W Lavinder
(74) *Attorney, Agent, or Firm* — Volpe and Koenig, P.C.

(57) ABSTRACT

A tensioning apparatus having at least one basic body (1) and at least one tensioning lever (2) which is arranged so as to be pivotable on the basic body (1), wherein at least two basic body clamping bodies (4, 5), which interact with one another for releasably clamping a strap (3) on the basic body (1), are arranged on the basic body (1) and at least one tensioning lever clamping apparatus is arranged on the tensioning lever (2) for releasably clamping the strap (3) on the tensioning lever (2) and at least one of the basic body clamping bodies (4) is mounted on the basic body (1) so as to be movable, preferably pivotable, and the basic body clamping body (4), which is mounted on the basic body (1) so as to be movable, has at least one opening nose (6), wherein, in a clamping position of the basic body clamping bodies (4, 5), for guiding the strap (3) about the opening nose (6), the opening nose (6) is arranged in a space (7) between a strap abutment surface (8) of the other basic body clamping body (5) and a strap abutment surface (9) of the tensioning lever clamping apparatus.

14 Claims, 8 Drawing Sheets

(56) References Cited

U.S. PATENT DOCUMENTS

| | | |
|---|---|---|
| 2004/0158955 A1 | 8/2004 | Acton et al. |
| 2010/0122437 A1 | 5/2010 | Hortnagl |
| 2011/0209314 A1 | 9/2011 | Miller |
| 2013/0291344 A1 | 11/2013 | Hortnagl |
| 2013/0326848 A1* | 12/2013 | Strahl .................. 24/69 ST |
| 2014/0000067 A1 | 1/2014 | Hortnagl |

FOREIGN PATENT DOCUMENTS

| | | |
|---|---|---|
| AU | 4661472 | 3/1974 |
| AU | 4661472 A1 | 3/1974 |
| DE | 1992277 | 8/1968 |
| DE | 1557477 | 4/1970 |
| DE | 82300 | 5/1971 |
| DE | 2115471 | 2/1972 |
| DE | 2245343 | 3/1973 |
| DE | 2419160 | 10/1975 |
| DE | 2552993 | 6/1977 |
| DE | 2928028 | 1/1981 |
| DE | 8213354 | 9/1982 |
| DE | 3346755 | 7/1985 |
| DE | 19712582 | 10/1998 |
| DE | 19829899 | 5/1999 |
| DE | 10119469 | 11/2002 |
| EP | 0043198 | 1/1982 |
| EP | 0111831 | 6/1984 |
| EP | 0925734 | 4/2003 |
| FR | 2556421 | 6/1985 |
| GB | 1066740 | 4/1967 |
| GB | 2244079 | 11/1991 |
| GB | 2295198 | 5/1996 |
| WO | 9961209 | 12/1999 |
| WO | 0035711 | 6/2000 |
| WO | 0037511 | 6/2000 |

* cited by examiner

TENSIONING APPARATUS

INCORPORATION BY REFERENCE

The following documents are incorporated herein by reference as if fully set forth: Austrian Patent Application A716/2012, filed Jun. 28, 2012.

BACKGROUND

The present invention relates to a tensioning apparatus having at least one basic body and at least one tensioning lever which is arranged so as to be pivotable on the basic body, wherein at least two basic body clamping bodies, which interact with one another for releasably clamping a strap on the basic body, are arranged on the basic body and at least one tensioning lever clamping apparatus is arranged on the tensioning lever for releasably clamping the strap on the tensioning lever and at least one of the basic body clamping bodies is mounted on the basic body so as to be movable, preferably pivotable.

The most varied tensioning apparatuses are used in the prior art for tensioning a belt or a tensioning strap and holding it in the tensioned state. They are used, for example, for fastening loads on or to vehicles. However, they can also be used, for example, whenever straps or tensioning straps have to be lengthened or connected together.

The most varied tensioning apparatuses are known in the prior art for tensioning straps. Widely used are so-called ratchet systems where the strap is pushed through a slot in a tensioning bolt and the tensioning bolt is then rotated by means of a tensioning lever and a ratchet mechanism until the strap is tensioned by being wound on the tensioning bolt. Using these tensioning apparatuses which are known per se it is certainly possible to achieve high tensile forces on the strap, however the operation, as a rule, is not completely trivial. Thus, above all, there are problems when too much strap is wound onto the tensioning bolt before the strap is sufficiently tensioned. In addition, relieving the tension of such a tensioning apparatus is often difficult.

In order to eliminate the problem where the strap is wound too much onto the tensioning bolt, generic tensioning apparatus are already known where the strap is able to be tensioned in a quasi endless manner by the tensioning lever being correspondingly actuated. An example of a generic tensioning apparatus can be found in DE 29 28 028 A1.

Where the tensioning operation is by means of pivoting the tensioning lever, in the case of said generic tensioning apparatuses known in the prior art the strap has to be tensioned between the tensioning lever clamping apparatus and the basic body clamping bodies so strongly initially that the basic body clamping bodies are pivoted and release the strap to be pulled through between them. Before the basic body clamping bodies release the strap for further tensioning, in the extensively tensioned state of the strap and where the forces are correspondingly high, this can result in considerable longitudinal expansion of the strap between the still closed basic body clamping bodies and the tensioning lever clamping apparatus. As a result, when the tensioning lever executes a pivoting stroke, relatively little strap is pulled through between the basic body clamping bodies since part of the pivoting movement of the tensioning lever is needed just for stretching the strap between the basic body clamping bodies and the tensioning lever clamping apparatus and does not bring about any strap movement.

SUMMARY

It is the object of the invention to provide an improvement in this respect in the case of generic tensioning apparatuses.

This is achieved by the basic body clamping body, which is mounted on the basic body so as to be movable, having at least one opening nose, wherein, in a clamping position of the basic body clamping bodies, for guiding the strap about the opening nose the opening nose is arranged in a space between a strap abutment surface of the other basic body clamping body and a strap abutment surface of the tensioning lever clamping apparatus.

By means of the opening nose and the strap which is guided around or diverted around it, an opening or releasing of the strap on the part of the basic body clamping bodies is effected as soon as the tensioning operation of the strap begins by means of the tensioning lever and the tensioning lever clamping apparatus. This avoids part of the tensioning stroke or of the pivoting movement of the tensioning lever carried out at the same time being needed exclusively for stretching the strap between the basic body clamping bodies and the tensioning lever clamping apparatus. Almost the entire path or stroke of the tensioning lever during its pivoting movement can be used for conveying and consequently for tensioning the strap.

It is a particular advantage of the tensioning apparatus as claimed in the invention that it can be realized as a so-called endless tensioning apparatus where the maximum tensioning path of the strap is not defined, as in the prior art, by winding the strap onto a tensioning bolt.

A method for tensioning a strap using a tensioning apparatus as claimed in the invention provides that when pivoting the tensioning lever in relation to the basic body in a tensioning direction, the strap is clamped on the tensioning lever by the tensioning lever clamping apparatus and the opening nose of the movable basic body clamping body is pressed out of the space by the strap and, as a result, the movable basic body clamping body is moved into a release position, in which the strap is released by the basic body clamping bodies.

It is a particular advantage of tensioning apparatuses as claimed in the invention that they are suitable not only for tensioning a strap but also for tensioning cables. In this context it is pointed out that a strap is a belt, that is a longitudinally flexible object with a width which is clearly larger than its height or thickness, whilst a cable has a circular cross section or the thickness is at least approximately the same size as the width of the cable.

In the case of a method as claimed in the invention, it can then be provided in a corresponding manner that in place of the strap at least one cable is tensioned and/or clamped using the tensioning apparatus. It is also pointed out that tensioning apparatuses as claimed in the invention can naturally be realized such that at the same time they extend, for example, parallel to one another.

Preferred development forms of the invention provide that the tensioning lever clamping apparatus has at least two tensioning lever clamping bodies which interact with one another for releasably clamping the strap on the tensioning lever. In this case it can be provided that at least one of the tensioning lever clamping bodies is mounted so as to be movable, that is pivotable and/or also slidable, between at least one clamping position and at least one release position.

In order to generate as high as possible frictional forces and consequently holding forces between the strap and/or the cable and the basic body clamping bodies and/or the tensioning lever clamping bodies, it is favorable when the basic body clamping bodies and/or the tensioning lever clamping bodies have correspondingly large strap abutment surfaces for the strap. In order to achieve this, the strap abutment surfaces of the basic body clamping bodies and/or of the tensioning lever clamping bodies are realized in a curved manner at least in regions. In this regard it is also and/or additionally possible to realize the noted strap abutment surfaces as undulating and/or serrated surfaces per se. In this case, the outside surfaces of the basic body clamping bodies and/or of the tensioning lever clamping bodies are deemed as strap abutment surfaces, against which, when used correctly, the strap abuts at least in part.

In principle, the movable basic body clamping body can be mounted so as to be pivotable and/or slidable on the basic body. Preferred development forms of the invention provide that the pivotable basic body clamping body is mounted on the basic body so as to be pivotable about an axial pin. In this case, it can be provided in certain development forms that the axial pin is mounted in at least one elongated hole of the pivotable basic body clamping body or of the basic body. In this case, the basic body clamping body can then carry out both a pivoting movement and a sliding movement. The same can apply to movable tensioning lever clamping bodies. The movable basic body clamping bodies and/or the movable tensioning lever clamping bodies, when viewed in cross section, can be realized in a C-shaped manner and/or in the form of a nine. Their pivot axis or the hole or elongated hole for the axial pin around which they are pivotable can be arranged in preferred development forms in an eccentric manner such that the movable or pivotable basic body clamping bodies and/or the movable or pivotable tensioning lever clamping bodies form a type of one-sided lever or at least a lever which is longer at least on one side than on the side opposite the pivot axis. However, it can also be provided that at least one of the basic body clamping bodies and/or of the tensioning lever clamping bodies is fixed in its position on the basic body or the tensioning lever so as to be non-movable in relation to the tensioning lever. This fixed basic body clamping bodies or tensioning lever clamping bodies are in a preferred manner the counterpart or counterparts to the movable basic body clamping bodies or tensioning lever clamping bodies.

As said, in the case of the tensioning lever clamping bodies it can also be provided that at least one of the tensioning lever clamping bodies is mounted on the tensioning lever so as to be pivotable, preferably about an axial pin in relation to the tensioning lever. It is preferably provided, in this case, that the angular region, about which the tensioning lever clamping body is pivotable in relation to the tensioning lever, is defined.

The tensioning lever can be arranged on the basic body directly or also by imposing a connecting part so as to be pivotable. Since the tensioning lever, as a rule, is only required for the tensioning operation, particularly preferred development forms of the invention provide that the tensioning lever is arranged on the basic body so as to be removable, preferably in a tool-free manner. This too can be realized directly or also by imposing a connecting part.

BRIEF DESCRIPTION OF THE DRAWINGS

Further features and details of preferred development forms of the invention are explained by way of the following description of the figures.

In the figures.

DETAILED DESCRIPTION OF THE PREFERRED EMBODIMENTS

FIGS. 1 to 4 show the clamping apparatus or strap buckle for clamping the strap 3 in the tensioned state. In said first exemplary embodiment, the tensioning lever 2 along with the connecting part 12 is fastenable on the basic body 1 so as to be removable in a tool-free manner. The tensioning lever 2 together with the connecting part 12 has been removed from the basic body 1 in FIGS. 1 to 4. On the outside of the basic body 1 there are journals 20 which, as shown in the following figures, serve for fastening the tensioning lever 2 on the basic body 1 by means of the connecting device 12.

As can already be seen well in FIGS. 1 to 4, the basic body 1 of said exemplary embodiment is designed such that two straps 3 can be fastened on the basic body 1. Naturally, this does not necessarily have to be so. Corresponding tensioning apparatuses or basic bodies 1 as claimed in the invention can also be designed for the purpose of fastening just one strap or for fastening even more than two straps 3. The form of the basic body 1 and also the number of basic body clamping bodies 4 and 5 can be varied in a corresponding manner. The interaction between the basic body clamping bodies 4 and 5 for clamping the strap 3 on the basic body 1 can be seen particularly well in the first exemplary embodiment in the two longitudinal sections of FIGS. 3 and 4.

Figure 1:
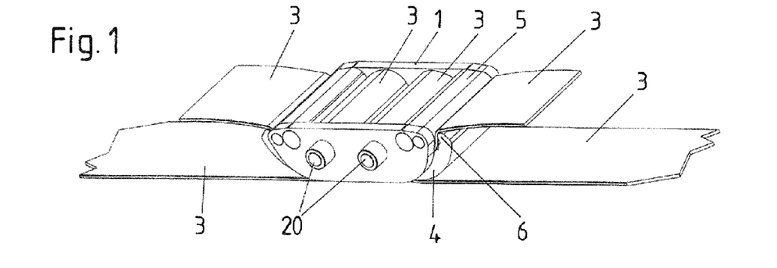
FIGS. 1 to 14 show representations of a first exemplary embodiment of a tensioning apparatus as claimed in the invention.
Figure 2:
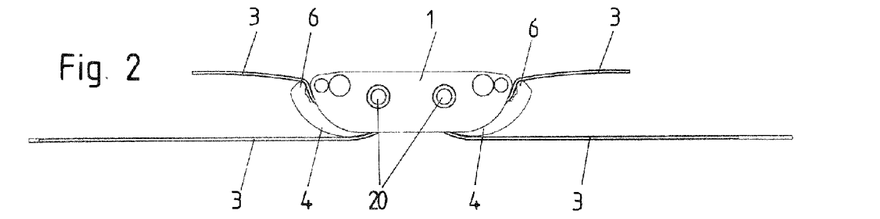
Figure 3:
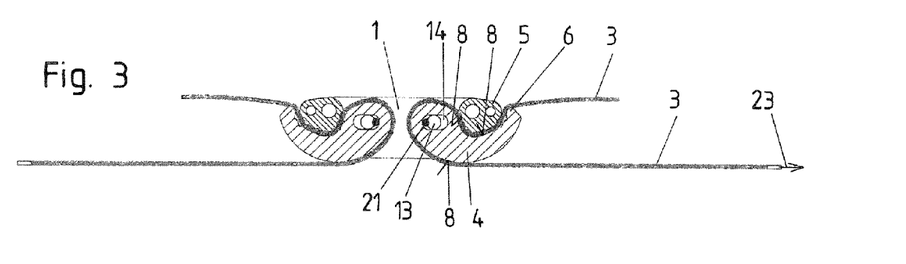
Figure 4:
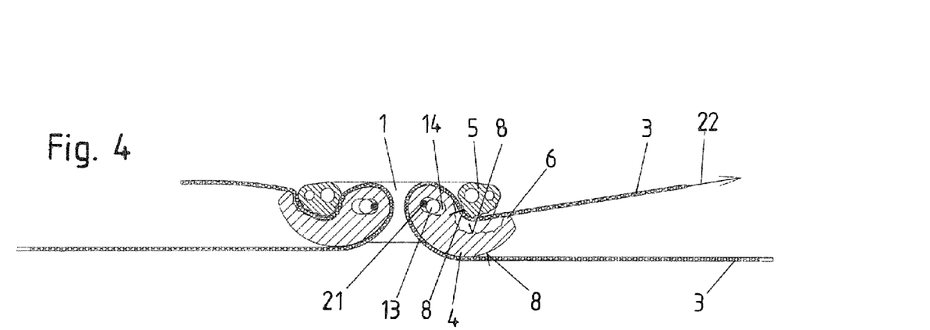

The movable basic body clamping body 4 is mounted in said exemplary embodiment on the basic body 1 so as to be pivotable and is realized in an approximately C-shaped manner. It has correspondingly curved strap abutment surfaces 8 in order to make the available contact or frictional surfaces as large as possible for fixing the strap 3. The strap abutment surfaces 8 of the other basic body clamping body 5 are also curved in regions. The basic body clamping body 5 is fixed in its position on the basic body 1 in a non-movable manner in relation to said basic body 1. In order to enable the pivoting movement of the basic body clamping body 4, said basic body clamping body is mounted so as to be pivotable about the axial pin 13 which is arranged in a fixed manner on the basic body 1. In the first exemplary embodiment, said axial pin 13 penetrates an elongated hole 14 in the basic body clamping body 4 such that this latter is also able to carry out a sliding movement. An elastic pretensioning body 21 provides a certain pretensioning between the basic body 1 and the basic body clamping body 4.

In order to increase the friction or the holding forces for the strap 3 even further, the strap abutment surfaces 8 of the basic body clamping bodies 4 and 5, in this exemplary embodiment, are realized in an undulating or serrated manner in regions.

In the case of the variant shown here in the first exemplary embodiment, the opening nose 6 is situated on the pivotably mounted basic body clamping body 4, on its end opposite the elongated hole 14. The function as claimed in the invention of said opening nose 6 is explained further below by way of FIGS. 8 and 10.

FIG. 3 shows the clamping position in which the strap 3 is clamped on the basic body 1 such that the strap 3 when pulled in the direction 23, as shown in FIG. 3, cannot be pulled away from the basic body 1 or through between the basic body clamping bodies 5. By guiding the strap around the pivotable basic body clamping body 4, which can be seen particularly well in FIGS. 3 and 4, when there is a correspondingly strong pull in the direction 23 the pivotable basic body clamping body 4 is pressed particularly strongly against the strap 3 and the fixed basic body clamping body 5 such that the holding forces are increased even further.

FIG. 4 shows on the right-hand side of the basic body 1, how, in the open position, the strap 3 can be pulled by hand away from the basic body clamping body 4 and basic body clamping body 5 in the direction 22. In said open position, the basic body clamping body 4 is pivoted away somewhat from the fixed basic body clamping body 5 such that the strap 3 is able to be pulled through between the two basic body clamping bodies 4 and 5 in the direction 22.

Figure 5:
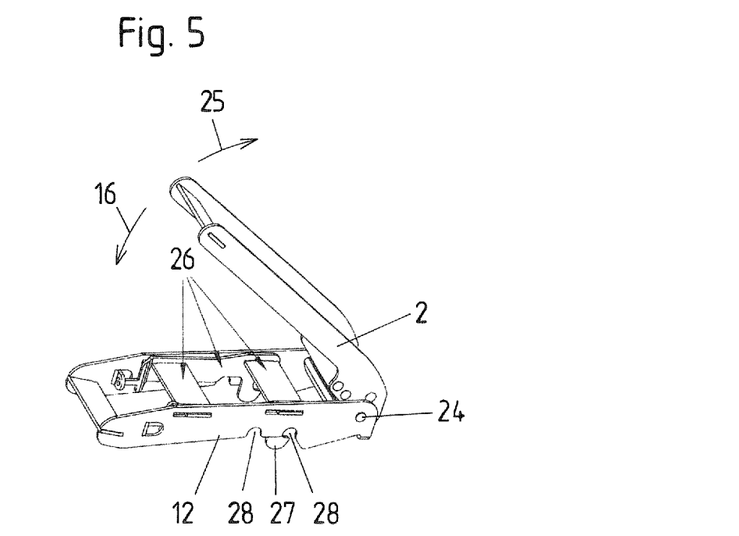

FIG. 5 shows the tensioning lever 2 and the connecting part 12 of said first exemplary embodiment of a tensioning apparatus as claimed in the invention detached from the basic body 1. The exemplary embodiment shown is a tensioning apparatus with a clamping apparatus for clamping a strap 3 in at least one tensioning state and a tensioning lever 2 to change the tensioning state of the strap 3, the tensioning lever 2 being held on the basic body 1 or the clamping apparatus by means of a connecting device so as to be removable in at least one operating state. The clamping apparatus, in this case, is formed by the basic body 1 and its basic body clamping bodies 4 and 5. In preferred developments, like the one discussed here, it is provided at the same time that the connecting device has at least one securing element, the securing element having at least one closed state in which the tensioning lever 2 is fixed on the clamping apparatus or the basic body 1 and the securing element having at least one open state in which the tensioning lever 2 is removable from the clamping apparatus or the basic body 1. In the form shown here, said securing element is formed by the fixing carriage 26 with the fixing hooks 27. These are mounted so as to be resiliently slidable on the connecting part 12 (not shown here in any more detail). Over and above this, journal receiving means 28, which serve for accommodating the journals 20 of the basic body 1 when the connecting part 12 together with the tensioning lever 2 are fastened on the basic body 1 for the tensioning operation, are also situated on the connecting part 12.

Figure 6:
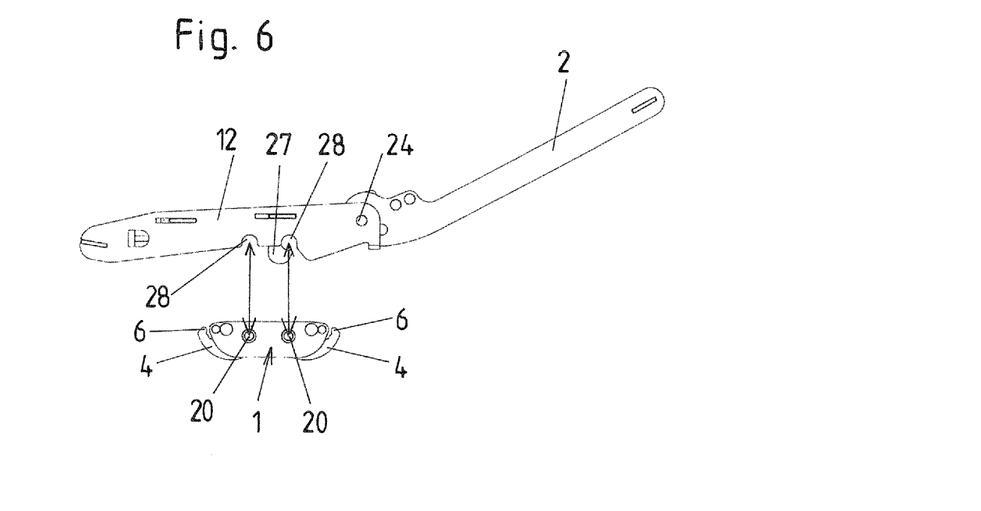

FIG. 6 shows by means of the double arrows the connection of the connecting part 12 to the basic body 1, that is the fitting of the connecting part 12 with its journal accommodating means 28 onto the journals 20 of the basic body 1. In the fitted state in which the journals 20 are situated in the journal accommodating means 28, the fixing carriage 26 with its fixing hooks 27 secure the connecting part 12 together with the tensioning lever 2 in its position on the basic body 1. The tensioning lever 2 serves for tensioning, that is for increasing the tensioning state of the strap 3. It is pivoted in the tensioning direction 16 for this purpose, as described further below and shown by way of the following figures. The resetting of the tensioning lever 2 is effected in the opposite direction 25 so that then subsequently the next tensioning stroke can take place in the tensioning direction 16 by pivoting the tensioning lever 2 about its pivot axis 24 in relation to the connecting part 12 and consequently to the basic body 1.

The resilient element for pretensioning the fixing carriage 26 and consequently the fixing hooks 27 in the direction toward its closed state cannot be seen in FIG. 5. However, this can, for example, be a simple helical spring which is arranged in a suitable manner between the fixing carriage 26 and the connecting part 12 in order to pretension the fixing carriage 26 together with the fixing hooks 27 in the direction toward the closed state. In this manner, the connecting device is realized as a snap-type connecting device by means of the fixing carriage 26 and its fixing hooks 27. Such snap-type connections are preferred, but are naturally not the only manner in which the connecting part 12 can be fastened on the basic body 1 or on the clamping apparatus. Other fastening possibilities are also possible, such as simply slipping-on, screw-connecting, riveting or the like. Over and above this, variants of the invention are naturally also possible where the tensioning lever 2 is mounted directly on the basic body 1. A corresponding connecting part 12 can then be dispensed with in said variants. In the design variants in which the tensioning lever 2 is arranged directly on the basic body 1, the pivot axis 24 is also arranged on the basic body 1. To complete the picture, for variants with connecting parts 12 it is naturally also pointed out that the journals 20 can also be arranged on the connecting part 12 and corresponding journal accommodating means 28 together with fixing carriage 26 and fixing hooks 27 can also naturally be arranged on the basic body 1.

Figures 7, 8, 9:
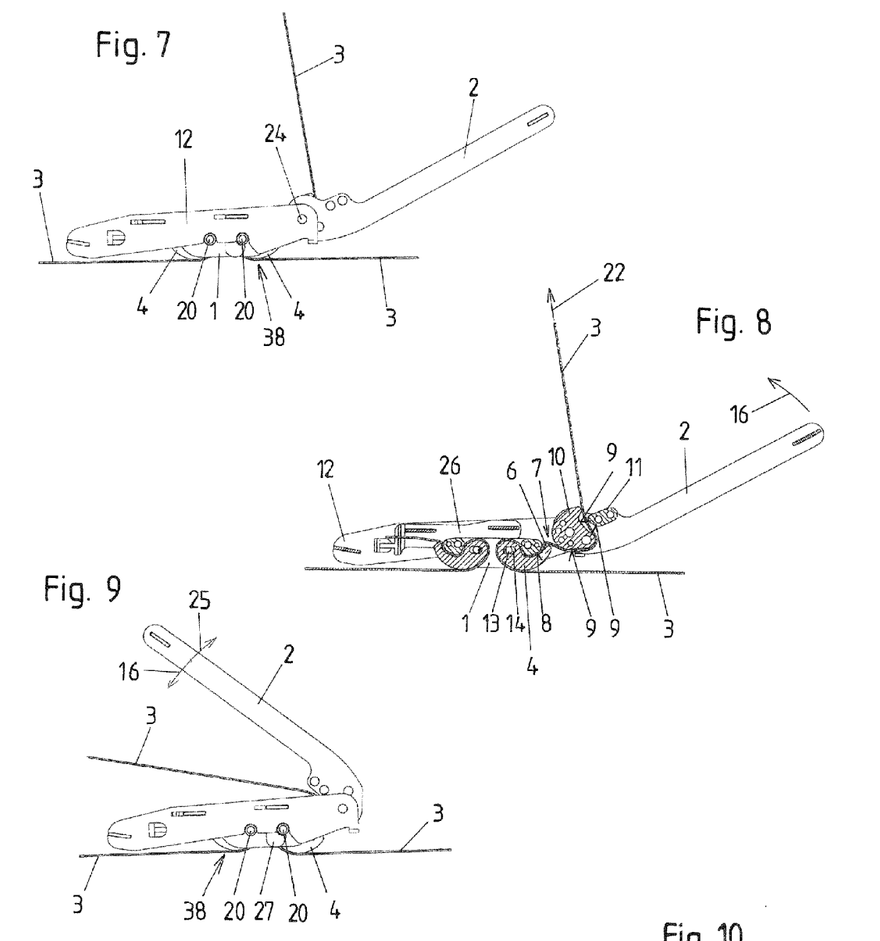

FIGS. 7 and 9 each show a position in which the connecting part 12 together with the tensioning lever 2 are snapped-on or arranged on the basic body 1 for tensioning the strap 3. In FIGS. 7 and 9, the journals 20 of the basic body 1 are locked in the journal accommodating means 28 by means of the fixing hooks 27. To remove the tensioning lever 2 together with the connecting part 12 from the basic body 1, the fixing carriage 26 together with the fixing hooks 27 have to be slid into an open position in which the journals 20 can be removed out of the journal accommodating means 28.

Figure 10:
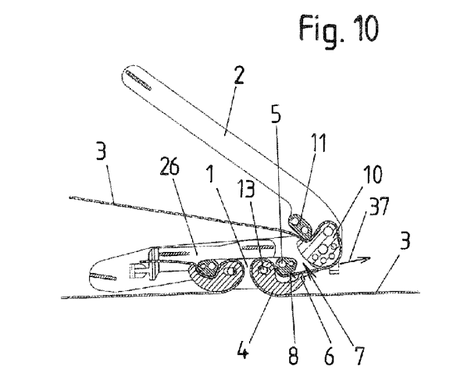
Figure 11:
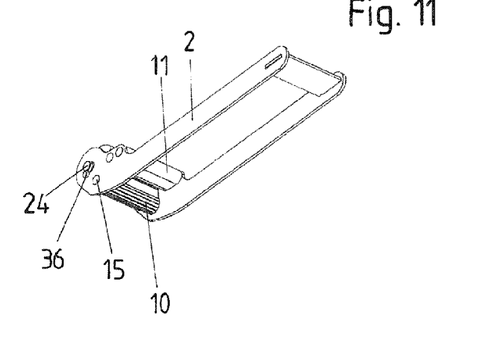
Figure 12:
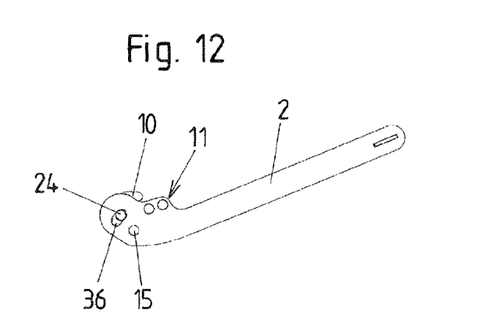

FIG. 7 shows the situation at the start of a tensioning operation. FIG. 8 shows a longitudinal section in said situation. In FIG. 9 the tensioning lever 2 has already been pivoted in the tensioning direction 16 relatively far about its axis 24. A position in the middle of the tensioning operation is therefore shown. FIG. 10 shows a longitudinal section through the situation according to FIG. 9. The type of design of the tensioning lever clamping apparatus of the first exemplary embodiment can also be seen particularly well in FIGS. 8 and 10 for the first time. The tensioning lever clamping apparatus has two tensioning lever clamping bodies 10 and 11 which interact together. The two tensioning lever clamping bodies 10 and 11 have curved strap abutment surfaces 9 for the strap 3. This, in turn, produces relative large friction surfaces and consequently large clamping forces. The tensioning lever clamping body 11 is arranged fixed on the tensioning lever 2, that is arranged on said tensioning lever 2 so as to be nonmovable in relation to said tensioning lever 2. The tensioning lever clamping body 10 is fastened on the tensioning lever 2 so as to be pivotable about the axial pin 15 which can be seen in FIGS. 11 and 12. This pivotability of the tensioning lever clamping body 10 in relation to the tensioning lever 2 can only be effected over a defined angular region in the case of the variant shown. This is realized in said exemplary embodiment such that the pin 24, which is fastened on the tensioning lever clamping body 10 and at the same time forms the pivot axis 24 of the tensioning lever 2 in relation to the connecting part 12 and consequently to the basic body 1, is guided in a lengthdefined elongated hole 36 in the tensioning lever 2. The pivot axis 24 therefore serves, on the one hand, as a pivot axis between the tensioning lever 2 and the connecting part 12 and, on the other hand, as part of the angular definition for the pivotability of the tensioning lever clamping body 10 in relation to the tensioning lever 2.

The tensioning operation as claimed in the invention is depicted below by way of a comparison between FIGS. 8 and 10. The starting point in this case is the state according to FIG. 8. Here, the two basic body clamping bodies 4 and 5 are situated in their clamping position in which, as depicted in the introduction, they clamp the strap 3. The opening nose 6, around which the strap 3 is guided or diverted, is situated in a space 7 between the strap abutment surface 8 of the basic body clamping body 5 and a strap abutment surface 9 of the tensioning lever clamping apparatus, here of the pivotable tensioning lever clamping body 10. In the initial position shown in FIG. 8 at the start of a clamping stroke or pivoting operation in the tensioning direction 16, the tensioning lever clamping apparatus is open, the strap 3 can be pulled through between the tensioning lever clamping bodies 10 and 11 in the direction 22 shown in FIG. 8. If now proceeding from FIG. 8, to introduce a tensioning stroke or tensioning operation, the tensioning lever 2 is pivoted in the tensioning direction 16 about its pivot axis 24, the strap 3 is clamped between the tensioning lever clamping bodies 10 and 11 and is pulled in the direction 37 shown in FIG. 10. This leads to the opening nose 6 being pressed out of the space 7 by the strap 3 guided around it, as a result of which the basic body clamping body 4 is pivoted into a release position in which the strap 3 is released, that is is no longer clamped, by the basic body clamping bodies. This situation is shown as an example in FIG. 10. The achievement here, as explained in the introduction, is that the basic body clamping bodies 4 and 5 open rapidly during the tensioning stroke and consequently a large part of the pivot path in the tensioning direction 16 is actually used for increasing the tension or retightening the strap 3 in the direction 37 and is not lost by the stretching of the strap 3. In this regard, a relatively large portion of the strap 3 is therefore always conveyed per tensioning stroke, as a result of which a relatively large increase in the tensioning of the strap 3 can be achieved per tensioning stroke. At the end of the tensioning stroke, the tensioning lever 2 can no longer be pivoted further in the tensioning direction 16. It is then pivoted back in the opposite direction 25 into the position according to FIG. 8 to prepare for the next tensioning stroke. The strap 3 can then be retightened by hand insofar as necessary in the direction 22 between the open tensioning lever clamping bodies 10 and 11, whilst, in their clamping position according to FIG. 8, the basic body clamping bodies 4 and 5 hold the strap 3 in the tensioned position. The tensioning operation depicted can be repeated as often as is necessary for tensioning the strap 3 such that a type of endless tensioning apparatus is created where the maximum possible tensioning path of the strap 3 is not restricted by the ratchet systems often used up to now as in the prior art which was depicted in the introduction.

As can be seen particularly well in FIGS. 7 and 9, it is provided in the exemplary embodiment shown of the tensioning apparatus that the clamping apparatus, in the form of the basic body 1, in the operating state in which the tensioning lever 2 is held on the basic body 1, on at least one side of the tensioning apparatus protrudes by way of a strap guide side 38 beyond all other components of the tensioning apparatus. The advantage of this is that the tensioning apparatus, exclusively by inserting the strap 3, contacts the object by means of which the strap 3 is tensioned. The effect of this is that the components of the tensioning apparatus, that is in particular also the connecting part 12, cannot scratch or in any other way damage said object, by means of which the strap 3 is tensioned.

Once the tensioning operation has been completed, the tensioning lever 2 together with the connecting part 12 can be removed from the basic body 1 and consequently from the clamping apparatus by actuating the fixing carriage 26 in a corresponding manner. The tensioning lever 2 can then be used on other clamping apparatuses for tensioning other straps.

In practice, it is often difficult or needs a great deal of force to be expended to release a strap 3 again once it has been correspondingly clamped on the basic body in the clamping position. This applies in particular whenever the tensioning operation has been carried out by means of tensioning levers 2. In order to simplify the releasing of the basic body clamping body 4 from its clamping position, so-called release levers 29 can be used. Said release levers 29 can also be fastenable on the basic body 1 so as to be removable like the tensioning levers 2. There can also be a connecting device as in the case of the tensioning lever 2, said connecting device having a closed state in which the release lever 29 is fixed on the clamping apparatus or on the basic body 1 and in the open state of the connecting device the release lever 29 being once again removable from the clamping apparatus or the basic body 1.

Figures 13, 14:
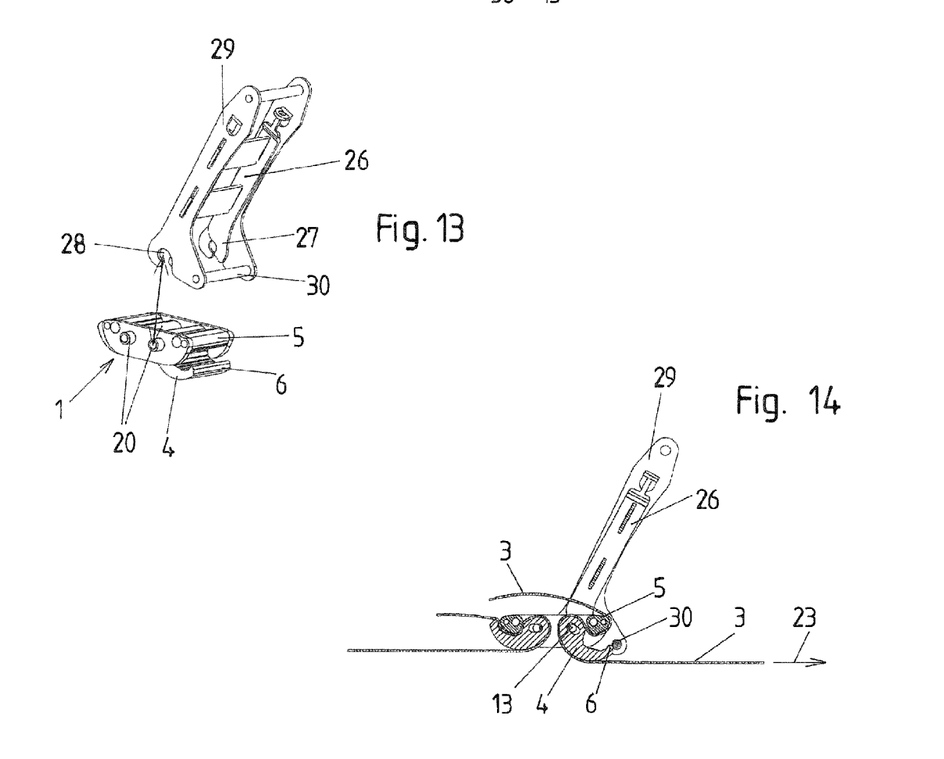

FIGS. 13 and 14 show an exemplary embodiment of such a release lever. This release lever is also fastened on the journals 20 of the basic body 1 by means of the fixing carriage 26 and the journal accommodating means 28. The respective journals 20 then also form the pivot axis about which the release lever 29 is pivoted in relation to the basic body 1. As can be seen particularly well in the longitudinal section according to FIG. 14, the release lever 29 has a release web 30, by way of which it acts on the opening nose 6 of the pivotably mounted basic body clamping body 4 to open the clamping connection between the basic body clamping bodies 4 and 5. In the open state of the basic body clamping bodies 4 and 5, the strap 3 can then be removed from the basic body 1 and consequently from the clamping apparatus in the direction 23. The releasable fastening of the release lever 29 on the basic body 1 is effected in an analogous manner to that of the connecting part 12 on the basic body 1. In a correspondingly analogous manner, the fixing carriage 26 is realized in this case too with spring loading (not shown here).

FIGS. 15 to 26 show a second development form of a tensioning apparatus as claimed in the invention. FIGS. 15 and 16 once again show the situation in which the tensioning lever 2 has been removed from the clamping apparatus or from its basic body 1, FIG. 15 showing a perspective representation and FIG. 16 showing a longitudinal section. All representations designated below as longitudinal sections are side views where, in each case, a side face of the basic body 1 or of the tensioning lever 2 has been removed or is not shown such that the components lying behind become visible. In the case of these variants also, it is possible to clamp two straps 3 at the same time on the basic body 1 or on the clamping apparatus. This too is naturally only an example. The clamping apparatuses can be for only one strap 3 or also for more than two straps.

Figure 16:
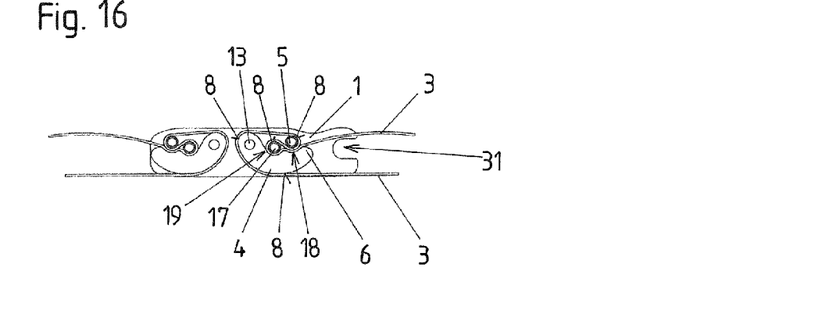

A first essential difference to the first exemplary embodiment is in the design and number of the basic body clamping bodies 4, 5 and 17. As can be seen particularly well in the sectional representation according to FIG. 16, in the case of said clamping apparatus for clamping a strap 3, it is provided that at least two basic body clamping bodies 5 and 17, which are realized as a web for winding the strap 3 around, are arranged on the basic body 1 of the clamping apparatus, in addition at least one third basic body clamping body 4, which is realized as a lever which is pivotable in relation to the basic body 1, being arranged on the basic body 1, the third basic body clamping body 4 being pivotable into a clamping position for clamping the strap between the basic body clamping bodies 5 and 17 which are realized as a web and the third basic body clamping body 4. The achievement here is that in the clamping position shown in FIG. 16, the pivotable basic body clamping body 4 presses the strap 3 against the two basic body clamping bodies 5 and 17 which are realized as a web. By using two basic body clamping bodies 5 and 17 which are realized as a web, it is possible, as can be seen in FIG. 16, for the strap to double between at least one of the basic body clamping bodies 5 and 17, in this case the basic body clamping body 5, and the third, that is the pivotable basic body clamping body 4 and to extend abutting against itself. This strap-on-strap position achieves particularly high clamping forces, which are increased even more by the pivotable basic body clamping body 4 pressing on the strap 3. The two basic body clamping bodies 5 and 17, which are realized as a web for winding the strap 3 around, have in this case a circular cross section, which does not, however, necessarily have to be provided. Particularly high holding and clamping forces can be achieved by the possibility of guiding the strap 3 around said two web-like basic body clamping bodies 5 and 17, which can be seen particularly well in FIG. 16, and the additional pressing by means of the third basic body clamping body 4. Preferred development forms, as those shown here, provide over and above this that the third pivotable basic body clamping body 4 has recesses 18 and 19 for the at least partial accommodation of the strap 3 and of in each case one of the basic body clamping bodies 5 and 17 which is realized as a web. In this way the clamping forces are increased again, just as by means of the strap abutment surfaces 8 of the basic body clamping bodies 4, 5 and 17, which are curved at least in regions, preferably completely. All in all, very high holding forces are achieved in this way without it also being necessary to realize the strap abutment surface 8 in a roughened manner, that is with ribs or undulations or the like. This means that the strap 3 is protected over the long-term and its service life is increased. The pivotable basic body clamping body 4, in this exemplary embodiment, is mounted so as to be pivotable about a fixed axial pin 13. In a favorable manner, the axial pin 13 and the basic body clamping bodies 4 and 5 which are realized as a web extend parallel to one another.

Figure 15:
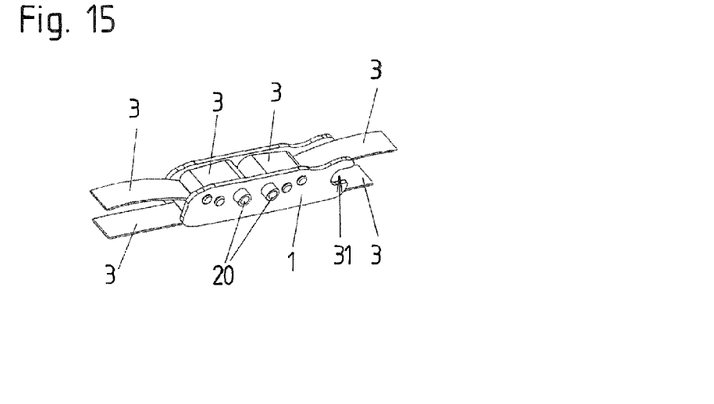
FIGS. 15 to 26 show representations of a second exemplary embodiment of a tensioning apparatus as claimed in the invention.
Figure 17:
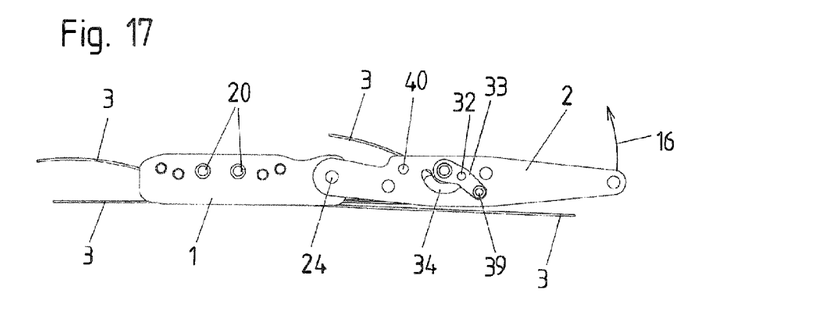
Figure 18:
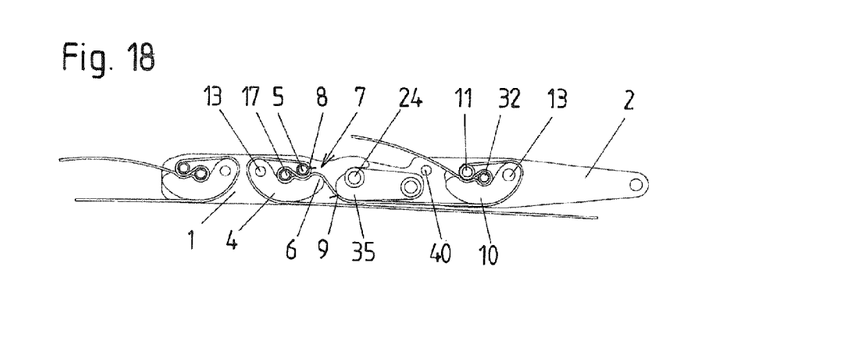

In FIG. 17 and FIG. 18, a tensioning lever 2 for tensioning, that is for increasing the tension forces on the strap 3, has been added to said basic body 1 or said clamping apparatus according to FIGS. 15 and 16. In said second exemplary embodiment, a simple pivot journal bearing 31, which is realized in the form of a recess open on the one side, is realized for this purpose on the basic body 1, into which pivot journal bearing the pivot axis 24 of the tensioning lever 2 can be inserted in a simple manner. In this case too, this is therefore a tensioning lever 2 which can be fastened in a releasable manner on the basic body 1, a connecting device with an additional securing element as per the fixing carriage 26 with the fixing hooks 27 as claimed in the first exemplary embodiment having been dispensed with. In said second exemplary embodiment, the pivot axis 24 is just simply inserted only into the pivot journal bearing 31. A corresponding connecting device with an additional securing element could naturally also be realized in said second exemplary embodiment.

As can be seen particularly well in the longitudinal section according to FIG. 18, the tensioning lever 2 of said exemplary embodiment has a guide connecting link 35 which has a strap abutment surface 9 for the strap 3 which is arranged eccentrically with reference to the pivot axis 24. This type of eccentricity can naturally also be realized in the case of other exemplary embodiments such as, for example, the first exemplary embodiment depicted above, by correspondingly forming the tensioning lever clamping body 10, it then being possible to achieve the same effects there by means of the eccentricity as are explained here below. In the clamping position according to FIG. 18 of the basic body clamping bodies 4 and 5 for guiding the strap 3 about the opening nose 6, the opening nose 6 of the pivotably arranged basic body clamping body 4 is also arranged in a space 7 between a strap abutment surface 8 of the basic body clamping body 5 and a strap abutment surface 9 of the tensioning lever clamping apparatus, as in the first exemplary embodiment. In this way, in an analogous manner, as depicted by way of FIGS. 8 and 10 in the case of the first exemplary embodiment, during the tensioning operation, that is during the pivoting of the tensioning lever 2 in the tensioning direction 16, an opening, that is a pivoting of the basic body clamping body 4 away from the other two basic body clamping bodies 5 and 17, is obtained, as a result of which the strap 3 can be tensioned in an analogous manner without being unnecessarily stretched between the basic body clamping bodies 4, 5 and 17 and the tensioning lever clamping apparatus. In this exemplary embodiment as also in other preferred exemplary embodiments, said effect of the rapid opening by means of the opening nose 6 is reinforced further by the eccentricity of the guide connecting link 35 or its strap abutment surface 9 with reference to the pivot axis 24. In this sense, it is favorable, as is also realized here, for the strap 3, by means of the eccentricity of the guide connecting link 35 or its strap abutment surface 9, to be guided more strongly around the opening nose 6 at the start of the tensioning stroke of the tensioning lever 2 when the basic body clamping bodies 4, 5 and 17 are situated in their clamping position, than if the strap 3 were to extend directly along the pivot axis 24. The further advantage of the selected eccentricity of the strap abutment surface 9 of the guide connecting link 35 is that the basic body clamping bodies 4, 5 and 17 are reset back into their clamping position again more rapidly at the end of the tensioning stroke of the tensioning lever 2. This prevents any tensioning path being lost when the tensioning lever 2 pivots back in the opposite direction 25. In addition, the eccentricity of the strap abutment surface 9 of the guide connecting link 35 reduces the manual force required by the user during the tensioning stroke.

Figure 19:
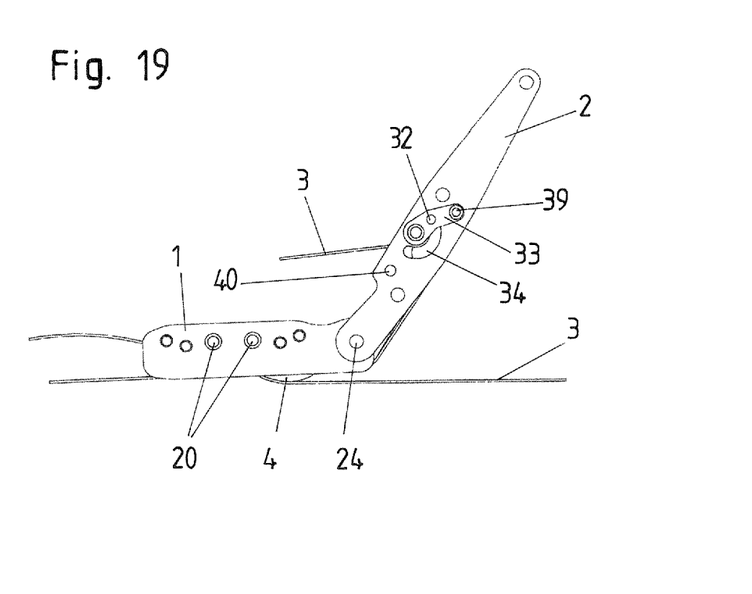
Figure 20:
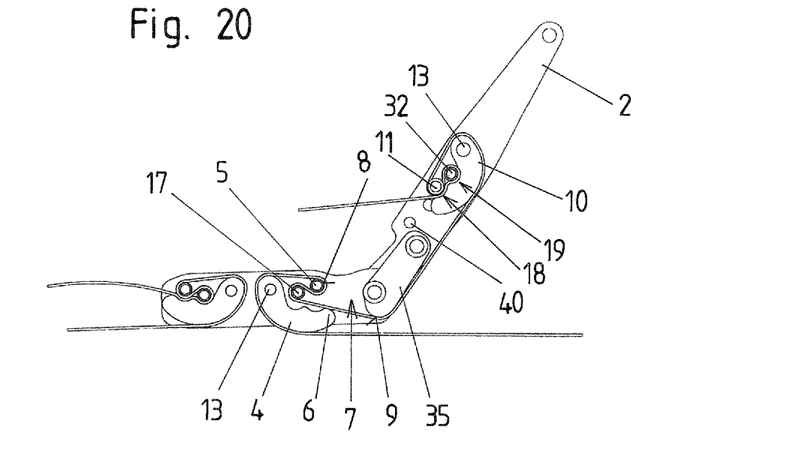

FIG. 20, which shows a longitudinal section through the situation according to FIG. 19, provides a situation during the tensioning stroke of the tensioning lever 2 in the tensioning direction 16 where the opening nose 6 of the pivotable basic body clamping body 4 has already been pressed out of the space 7 by the strap 3 and, as a result, the pivotable basic body clamping body 4 has been pivoted into a release position in which the strap 3 is able to be pulled through between the basic body clamping bodies 4, 5 and 17.

A further difference between said second exemplary embodiment and the first exemplary embodiment is in the development form of the tensioning lever clamping apparatus. In the second exemplary embodiment said tensioning lever clamping apparatus has tensioning lever clamping bodies 10, 11 and 32 which are realized in an analogous manner to the basic body clamping bodies 4, 5 and 17. The method of operation of said tensioning lever clamping apparatus corresponds to the interaction between the basic body clamping bodies 4, 5 and 17 just as does the respective design. In this case too, in the clamping position the tensioning lever clamping body 10, which is mounted so as to be pivotable on the tensioning lever 2, presses the strap 3 against the two other tensioning lever clamping bodies 11 and 32. In this case too, the strap 3 abuts directly against itself, as a result of which overall particularly high clamping forces are obtained in the clamping position. In this sense, therefore, the tensioning lever 2 of said exemplary embodiment can also be viewed as a clamping apparatus for clamping a strap 3, the clamping apparatus having a basic body in the form of the corresponding portions of the tensioning lever 2, on which are arranged at least two basic body clamping bodies, which are realized as a web for winding the strap 3 around, in this case in the form of the tensioning lever clamping bodies 11 and 32, at least one third basic body clamping body, which is realized as a lever which can be pivoted in relation to the tensioning lever 2 and is in the form of the tensioning lever clamping body 10, being arranged on the basic body in the form of the tensioning lever 2, said third basic body clamping body in the form of the tensioning lever clamping body 10 being pivotable into a clamping position for clamping the strap 3 between the tensioning lever clamping bodies 11 and 32, which are realized as a web, and the third tensioning lever clamping body 10.

Figures 21, 22, 23, 24, 25, 26:
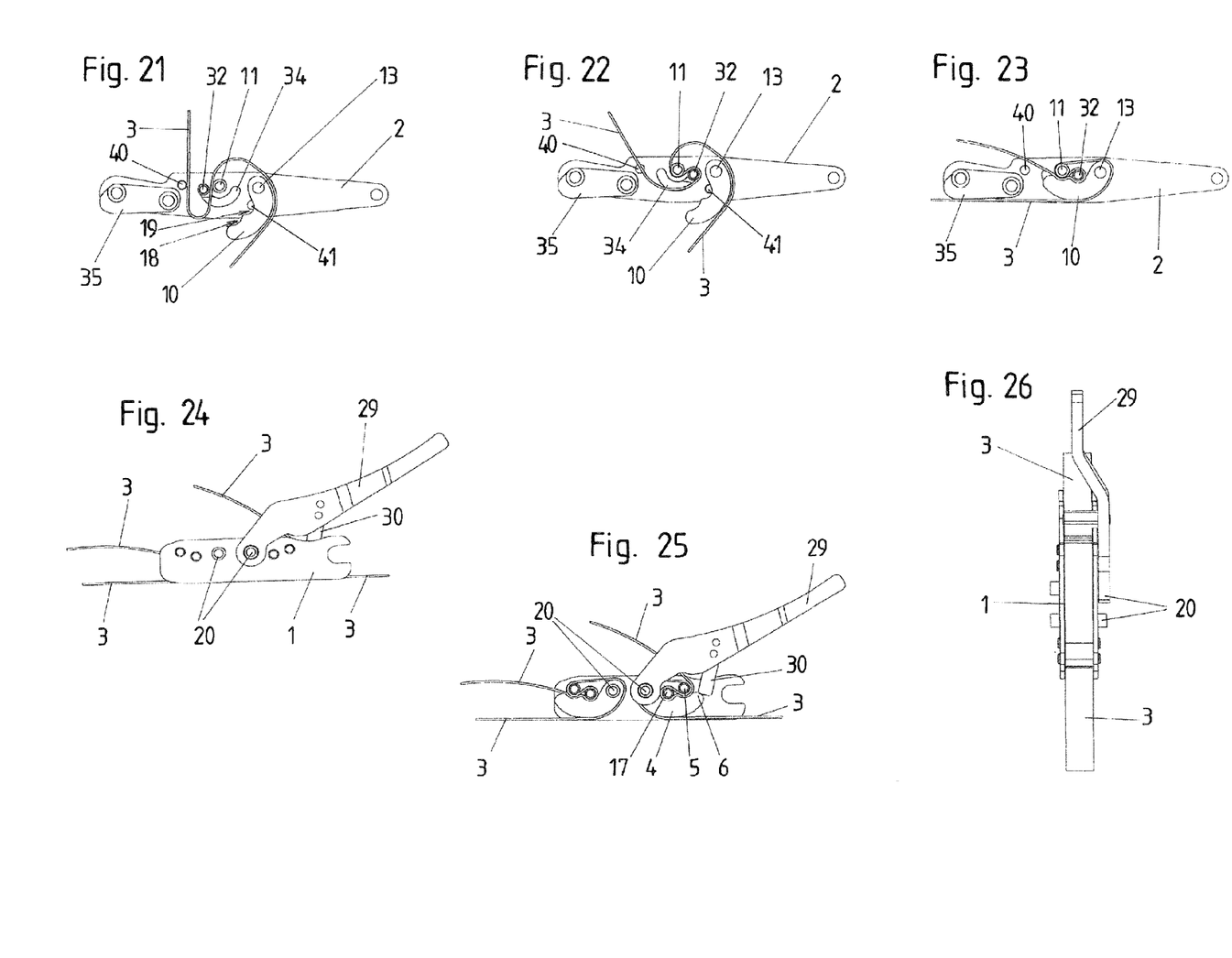

To make it easier to thread the strap through between the three basic body clamping bodies 4, 5 and 17 or the tensioning lever clamping bodies 10, 11 and 32, at least one of the basic body clamping bodies, which are realized as a web, or tensioning lever clamping bodies 32 can be mounted on the basic body so as to be adjustable in its position in relation to the basic body 1 or to the tensioning lever 2. In the exemplary embodiment shown in this case, this is realized on the tensioning lever 2 or on the tensioning lever clamping apparatus as an example by the tensioning lever clamping body 32, which is realized as a web, being able to be pivoted in the elongated hole 34 by means of the pivot lever 33. FIG. 21, in this case, shows the position of the tensioning lever clamping body 32 in which the strap 3 is able to be threaded through between the tensioning lever clamping bodies 10, 11 and 32 in a particularly simple manner. In FIG. 22 the adjustable tensioning lever clamping body 32 has been pivoted back again into its operating position in which it is arranged between the fixed, web-like tensioning lever clamping body 11 and the axial pin 13 of the pivotable tensioning lever clamping body 10. FIG. 23 shows the clamping position in which the pivotable tensioning lever clamping body presses the strap 3 against the two web-like tensioning lever clamping bodies 11 and 32. In this case, it is favorable when one of said adjustable basic body clamping bodies, which are realized as a web, or in this case tensioning lever clamping bodies 32, is lockable in at least one position. Preferably, in this case, this is the position in which it is arranged for clamping the strap. As an alternative to this or in addition to it, said adjustable basic body clamping body or in this case tensioning lever clamping body 32 can also be lockable, however, for example, in its position in which it is arranged for threading in the strap.

In the second exemplary embodiment shown here, the adjustable tensioning lever clamping body 32, which is realized as a web, is lockable in its two end positions. In this case, on the one hand, this is the position in which it is arranged for clamping the strap 3. In addition, said adjustable tensioning lever clamping body 32 can also be locked, however, in its position in which it is arranged for threading in the strap 3. In the exemplary embodiment shown, this is achieved by means of a latching pin which is pretensioned by means of a spring. This latching pin is situated on the handle part 39 of the pivoting lever 33 and, in the named end positions, latches into the holes 40 and 41 in order to achieve the desired locking of the tensioning lever clamping body 32 in a corresponding manner. To release said locking, the handle part 39 is pulled such that the latching pin (not visible here) is pulled out of the respective hole 40 or 41 and consequently the locking is lifted.

FIGS. 24, 25 and 26 show a release lever 29 for said exemplary embodiment. This release lever is fitted laterally onto one of the journals 20. It also has a release web 30, by way of which it acts on the opening nose 6 of the pivotable basic body clamping body 4 for opening. The one-sided fastening of the release lever 29 of said exemplary embodiment can be seen particularly well in the top view according to FIG. 26.

Figure 27:
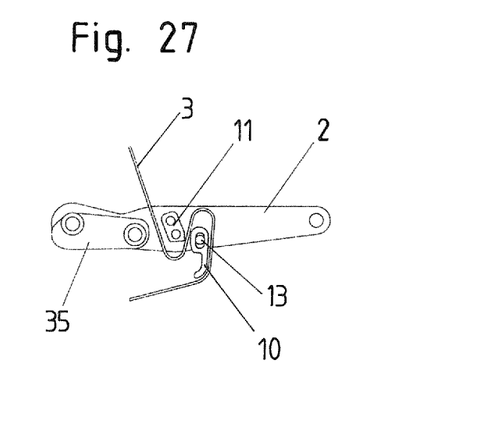
FIGS. 27 and 28 show a further alternative development of a tensioning lever clamping apparatus.
Figure 28:
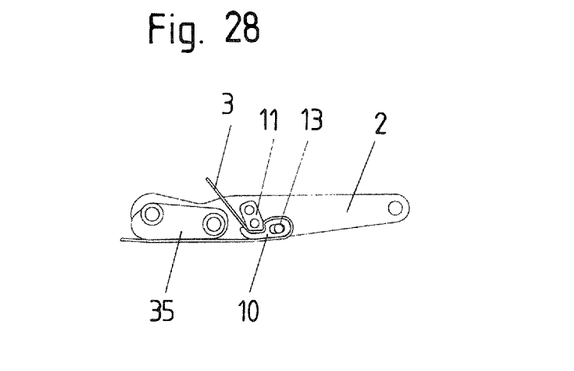

FIGS. 27 and 28 once again show an alternative development form of a tensioning lever clamping apparatus. In this variant, once again, only two tensioning lever clamping bodies 10 and 11 interact. The tensioning lever clamping body 11 is once again arranged in its position on the tensioning lever 2 in a fixed manner, that is so as to be immovable. The tensioning lever clamping body 10 is arranged on the tensioning lever 2 so as to be pivotable around the axial pin 13. The axial pin 13 penetrates an elongated hole 14 in the tensioning lever clamping body 10. The latter is realized in cross section in the form of a nine. FIG. 28 shows the clamping position and FIG. 27 shows the open position in which the strap can be pulled through between the tensioning lever clamping bodies 10 and 11.

Finally, it must also be pointed out that even if all three exemplary embodiments depicted here in detail relate to the use with a strap 3, the tensioning apparatuses as claimed in the invention are also nevertheless completely suitable for the corresponding tensioning of cables.

Key to Reference Numerals:

| | |
|---|---|
| 1 | Basic body |
| 2 | Tensioning lever |
| 3 | Strap |
| 4 | Basic body clamping body |
| 5 | Basic body clamping body |
| 6 | Opening nose |
| 7 | Space |
| 8 | Strap abutment surface |
| 9 | Strap abutment surface |
| 10 | Tensioning lever clamping body |
| 11 | Tensioning lever clamping body |
| 12 | Connecting part |
| 13 | Axial pin |
| 14 | Elongated hole |
| 15 | Axial pin |
| 16 | Tensioning direction |
| 17 | Basic body clamping body |
| 18 | Recess |
| 19 | Recess |
| 20 | Journal |
| 21 | Pretensioning body |
| 22 | Direction |
| 23 | Direction |
| 24 | Pivot axis |
| 25 | Opposite direction |
| 26 | Fixing carriage |
| 27 | Fixing hook |
| 28 | Journal accommodating means |
| 29 | Release lever |
| 30 | Release web |
| 31 | Pivot journal bearing |
| 32 | Tensioning lever clamping body |
| 33 | Pivot lever |
| 34 | Elongated hole |
| 35 | Guide connecting link |
| 36 | Elongated hole |
| 37 | Direction |
| 38 | Strap guide side |
| 39 | Handle part |
| 40 | Hole |
| 41 | Hole |

The invention claimed is:

1. A tensioning apparatus comprising:
at least one basic body;
at least one tensioning lever pivotably arranged on the basic body;
at least two basic body clamping bodies, which interact with one another for releasably clamping a strap or cable on the basic body, are arranged on the basic body;
at least one tensioning lever clamping apparatus arranged on the tensioning lever for releasably clamping the strap or cable on the tensioning lever;
wherein at least one of the basic body clamping bodies is mounted on the basic body so as to be movable;

the basic body clamping body, which is mounted on the basic body so as to be movable, has at least one opening nose, and, in a clamping position of the basic body clamping bodies, the opening nose is arranged in a space between a strap abutment surface of the other basic body clamping body and a strap abutment surface of the tensioning lever clamping apparatus, such that the strap or cable is guided about the opening nose.

2. The tensioning apparatus as claimed in claim 1, wherein the at least one of the basic body clamping bodies (4) that is movably mounted on the basic body (1) is pivotable on the basic body.

3. The tensioning apparatus as claimed in claim 1, wherein the tensioning lever clamping apparatus has at least two tensioning lever clamping bodies (10, 11) which interact with one another for releasably clamping the strap (3) on the tensioning lever (2).

4. The tensioning apparatus as claimed in claim 1, wherein the tensioning lever (2) is arranged on the basic body (1) directly or by interposing a connecting part (12) so as to be pivotable.

5. The tensioning apparatus as claimed in claim 4, wherein the tensioning lever (2) is arranged on the basic body so as to be removable in a tool-free manner.

6. The tensioning apparatus as claimed in claim 3, wherein at least one of the strap abutment surfaces (8, 9) of the basic body clamping bodies (4, 5) or the tensioning lever clamping bodies (10, 11) include at least one of an at least partially curved, undulating, or serrated surfaces.

7. The tensioning apparatus as claimed in claim 3, wherein at least one of the movable basic body clamping body (4) or the tensioning lever clamping body (10) is or are mounted so as to be pivotable about an axial pin (13).

8. The tensioning apparatus as claimed in claim 7, wherein the axial pin (13) is mounted in at least one elongated hole (14) of the movable basic body clamping body (4) or of the basic body (1) or of the movable tensioning lever clamping body (10) or of the tensioning lever (2).

9. The tensioning apparatus as claimed in claim 3, wherein at least one of the movable basic body clamping body (4) or the tensioning lever clamping body (10), when viewed in cross section is formed with a C-shape or is formed with a nine-shape.

10. The tensioning apparatus as claimed in claim 3, wherein at least one of the basic body clamping bodies or of the tensioning lever clamping bodies (11) is fixed in position on the basic body (1) or the tensioning lever (2) so as to be non-movable in relation to the basic body (1) or the tensioning lever (2).

11. The tensioning apparatus as claimed in claim 3, wherein one of the tensioning lever clamping bodies (10) is mounted on the tensioning lever (2) so as to be pivotable in relation to the tensioning lever (2).

12. The tensioning apparatus as claimed in claim 11, wherein the one of the tensioning lever clamping bodies (10) that is mounted on the tensioning lever (2) so as to be pivotable is mounted to be pivotable about an axial pin (15).

13. The tensioning apparatus as claimed in claim 12, wherein the one of the tensioning lever clamping bodies (10) that is mounted on the tensioning lever (2) so as to be pivotable is pivotable over a defined angular region.

14. A method for tensioning at least one strap or cable comprising:
providing a tensioning apparatus including at least one basic body, at least one tensioning lever pivotably arranged on the basic body, at least two basic body clamping bodies, which interact with one another for releasably clamping a strap or cable on the basic body, are arranged on the basic body, at least one tensioning lever clamping apparatus arranged on the tensioning lever for releasably clamping the strap or cable on the tensioning lever, wherein at least one of the basic body clamping bodies is mounted on the basic body so as to be movable, the basic body clamping body, which is mounted on the basic body so as to be movable, has at least one opening nose, and, in a clamping position of the basic body clamping bodies, for the opening nose is arranged in a space between a strap abutment surface of the other basic body clamping body and a strap abutment surface of the tensioning lever clamping apparatus, such that the strap or cable is guided about the opening nose; and
when pivoting the tensioning lever in relation to the basic body in a tensioning direction, clamping the strap or cable on the tensioning lever by the tensioning lever clamping apparatus and the opening nose of the movable basic body clamping body pressing out of the space by the strap or cable and, as a result, moving the movable basic body clamping body into a release position, releasing the strap or cable by the basic body clamping bodies.

* * * * *